(12) United States Patent
Barnes (10) Patent No.: US 11,254,055 B2
(45) Date of Patent: Feb. 22, 2022

(54) ADDITIVE MANUFACTURING MACHINE HEAT FLUX

(71) Applicant: HEWLETT-PACKARD DEVELOPMENT COMPANY, L.P., Houston, TX (US)

(72) Inventor: Arthur H. Barnes, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 764 days.

(21) Appl. No.: 16/075,920

(22) PCT Filed: Apr. 21, 2017

(86) PCT No.: PCT/US2017/028845
§ 371 (c)(1),
(2) Date: Aug. 6, 2018

(87) PCT Pub. No.: WO2018/194656
PCT Pub. Date: Oct. 25, 2018

(65) Prior Publication Data
US 2021/0213682 A1     Jul. 15, 2021

(51) Int. Cl.
*B29C 64/295*     (2017.01)
*B33Y 10/00*      (2015.01)
(Continued)

(52) U.S. Cl.
CPC .......... *B29C 64/295* (2017.08); *B29C 64/165* (2017.08); *B33Y 10/00* (2014.12); *B33Y 30/00* (2014.12)

(58) Field of Classification Search
CPC ....... B29C 64/00–393; B22F 10/00–85; B22F 12/00–90
See application file for complete search history.

(56) References Cited

U.S. PATENT DOCUMENTS

| 7,008,209 B2 | 3/2006 | Iskra et al. |
| 8,646,877 B2 | 2/2014 | Thompson et al. |

(Continued)

FOREIGN PATENT DOCUMENTS

| CN | 1030030120 A | 3/2013 |
| CN | 103842157 A  | 6/2014 |

(Continued)

OTHER PUBLICATIONS

King et al., "Laser Powder Bed Fusion Additive Manufacturing of Metals; Physics, Computational, and Materials Challenges", 2015, 27 Pages.

(Continued)

*Primary Examiner* — Mary Lynn F Theisen
(74) *Attorney, Agent, or Firm* — HP Inc. Patent Department (57) ABSTRACT

Some examples include methods of operating an additive manufacturing machine including generating thermal energy with a thermic source including a warming source and a fusing source, each of the warming and fusing sources having a major axis longitudinally extending in a y-axial direction above a build zone, the build zone to contain a build material and a fusing agent, moving the thermic source in a x-axial direction orthogonal to the y-axial direction over the build zone at a constant velocity, delivering a first substantially uniform heat flux from the warming source and a second substantially uniform heat flux from the fusing source to cause portions of the build material that the fusing agent is disposed on to form a layer of a three dimensional object, and continuously generating thermic energy from the thermic source during a build process of the three dimensional object.

12 Claims, 10 Drawing Sheets

(51) Int. Cl.
*B33Y 30/00* (2015.01)
*B29C 64/165* (2017.01)

(56) References Cited

U.S. PATENT DOCUMENTS

| | | |
|---|---|---|
| 9,492,956 B2 | 11/2016 | Horiuchi |
| 2005/0242473 A1 | 11/2005 | Newell et al. |
| 2012/0017829 A1 | 1/2012 | Panico et al. |
| 2014/0314613 A1* | 10/2014 | Hopkinson ............ B33Y 30/00 419/55 |
| 2015/0165681 A1 | 6/2015 | Fish et al. |
| 2016/0067929 A1 | 3/2016 | Park |
| 2016/0311164 A1 | 10/2016 | Miyano |
| 2017/0355137 A1* | 12/2017 | Ederer .................. B29C 64/165 |
| 2020/0108558 A1* | 4/2020 | Vermeulen ............ B29C 64/209 |

FOREIGN PATENT DOCUMENTS

| | | |
|---|---|---|
| CN | 106270877 A | 1/2017 |
| EP | 2739457 | 6/2014 |
| EP | 1648686 B2 | 6/2015 |
| JP | H08137325 A | 5/1996 |
| TW | 201607740 A | 3/2016 |
| WO | 2007039450 A1 | 4/2007 |
| WO | 2008145316 A2 | 12/2008 |
| WO | WO-2012012610 A3 | 4/2012 |
| WO | WO-2013021173 A1 | 2/2013 |
| WO | 2014144482 A1 | 9/2014 |
| WO | WO-2015106838 | 7/2015 |
| WO | 2016048348 A1 | 3/2016 |
| WO | 2016119898 A1 | 8/2016 |

OTHER PUBLICATIONS

Roy et al., "µ-SLS of Metals: Design of the Powder Spreader, Powder Bed Actuators and Optics for the System", Retrieved from Internet—https://sffsymposium.engr.utexas.edu/sites/default/files/2015/2015-11-Roy.pdf, 2015, pp. 134-155.

Wimpenny et al., "Selective Infrared Sintering of Polymeric Powders Using Radiant IR Heating & Ink Jet Printing", DeMontfort University, Sep. 14, 2006, pp. 789-799.

* cited by examiner

FIG. 10B

ADDITIVE MANUFACTURING MACHINE HEAT FLUX

BACKGROUND

Additive manufacturing machines produce 3D objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices each defining that part of a layer or layers of build material to be formed into the object.

BRIEF DESCRIPTION OF THE DRAWINGS

FIGS. 7A-10B are side and top schematic views illustrating an example sequence of a four pass fusing cycle using a fusing system of an additive manufacturing machine in accordance with aspects of the present disclosure.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In some additive manufacturing processes, thermic energy is used to fuse together the particles in a powdered build material to form a solid object. Thermic energy to fuse the build material may be generated, for example, by applying a liquid fusing agent to a thin layer of powdered build material in a pattern based on the object slice and then exposing the patterned area to fusing energy. Fusing energy absorbing components in the fusing agent absorb fusing energy to help sinter, melt or otherwise fuse the build material. The process is repeated layer by layer and slice by slice to complete the object.

Figure 1:
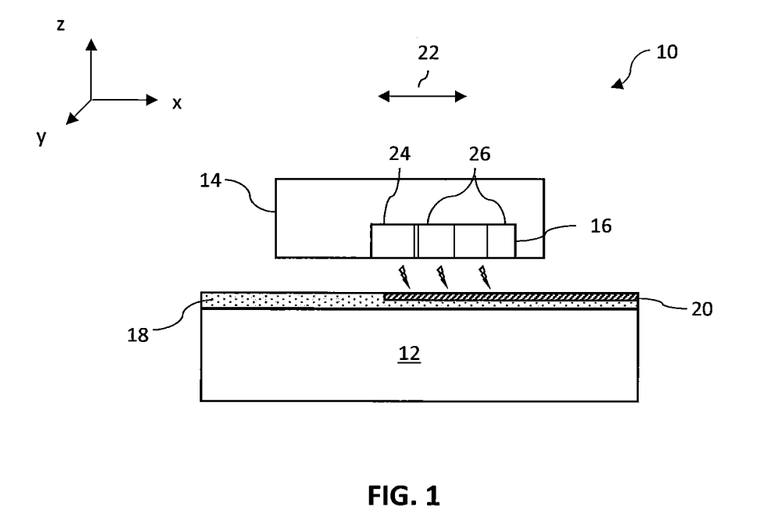
FIG. 1 is a schematic side view of an example fusing apparatus of an additive manufacturing machine in accordance with aspects of the present disclosure.

FIG. 1 is a schematic side view of an example fusing apparatus 10 for an additive manufacturing machine in accordance with aspects of the present disclosure. Fusing apparatus 10 includes a build chamber 12, a carriage 14, and a thermic source 16. Build chamber 12 can contain a build material 18 and a fusing agent 20. Thermic source 16 is mounted to carriage 14 and is movable bi-directionally along an x-axis with carriage 14, as indicated by arrow 22. Carriage 14 can be moved across build chamber 12 bi-directionally along the x-axis at a uniform velocity in each direction during a build process of a three dimensional object, as described further below.

Thermic source 16 includes a warming source 24 and a fusing source 26. Warming source 24 and fusing source 26 of thermic source 16 each extend longitudinally in a y-axial direction orthogonal to the x-axis. Thermic source 16 including warming source 24 having a lower color temperature than a color temperature of fusing source 26 can aid in control for heating and fusing of build material. In one example, warming source 24 has an 1800 degree Kelvin color temperature and fusing source 26 has a 2700 degree Kelvin color temperature. At 1800 degree Kelvin, for example, warming source 24 has a spectral power distribution favorably absorbed by build material and a greater amount of the thermic energy emitted by warming source 24 is absorbed than that of the higher color temperature fusing source 26. The higher color fusing source 26 of 2700 degree Kelvin color temperature has a spectral power distribution favorably absorbed by fusing agent 20 applied to build material 18. Other color temperatures can also be suitable. Fusing source 26 can be a color temperature sufficiently high to heat fusing agent 20 and build material 18 to selectively fuse build the build material 18. Warming source 24 can be of lower color temperature to selectively heat build material 18 without fusing the build material.

Figure 2A:
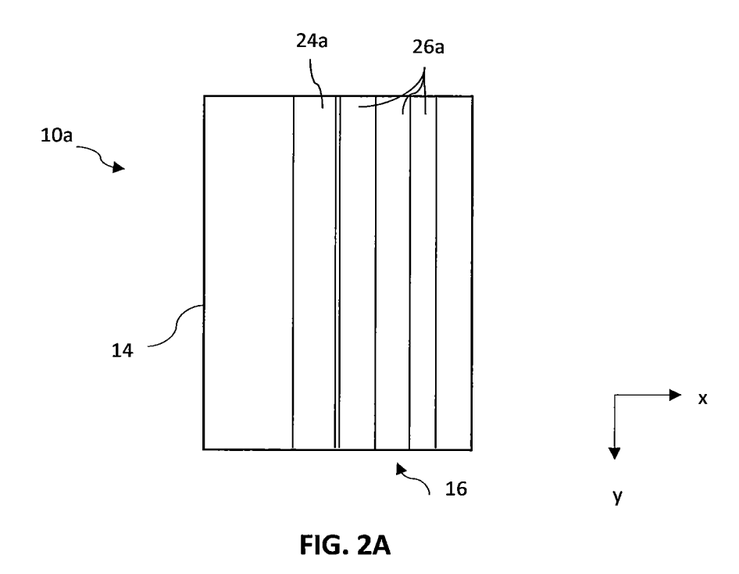
FIGS. 2A-2C are schematic bottom views of example fusing apparatuses of an additive manufacturing machine in accordance with aspects of the present disclosure.
Figure 2B:
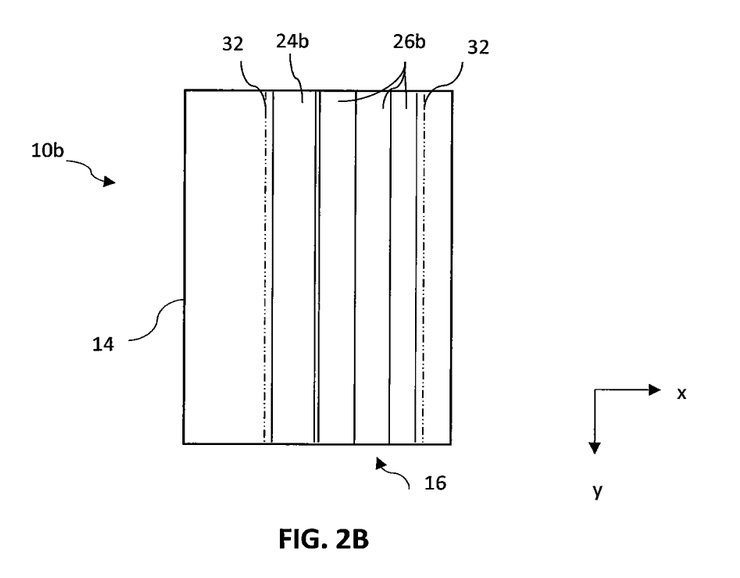
Figure 2C:
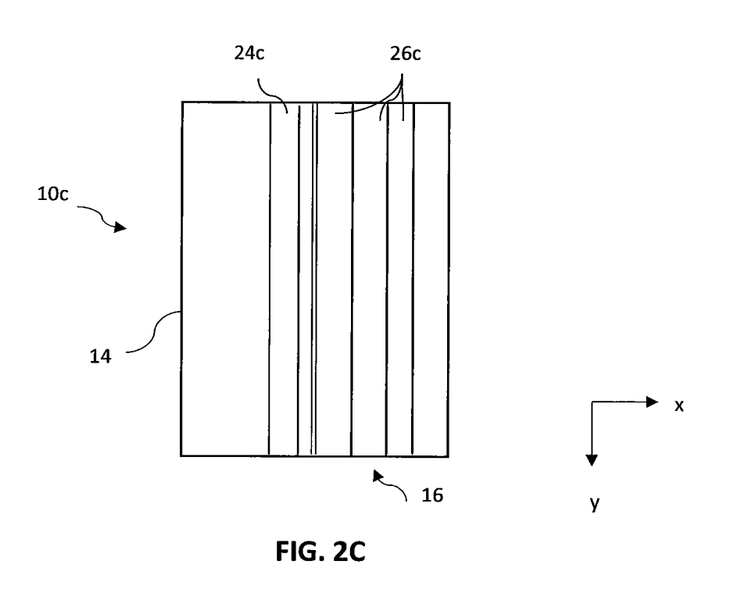
Figure 3A:
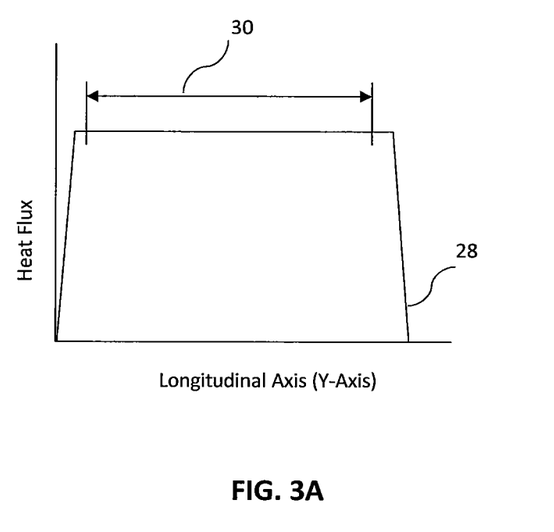
FIGS. 3A-3B are graphical representations of heat flux generated by example the fusing apparatuses of FIGS. 2A-2C in accordance with aspects of the present disclosure.
Figure 3B:
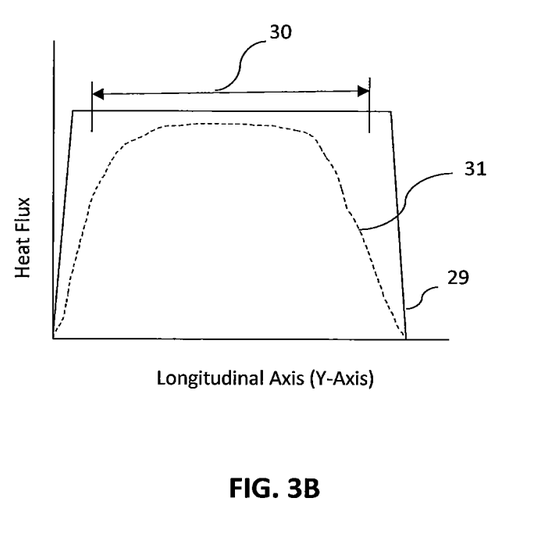

FIGS. 2A-2C are schematic bottom views of example fusing apparatuses 10a-10c of an additive manufacturing machine in accordance with aspects of the present disclosure. FIGS. 3A-3B are graphical representations of heat flux generated by example fusing apparatuses 10a-10c of FIGS. 2A-2C in accordance with aspects of the present disclosure. In general, warming and fusing sources 24, 26 each include lamps. Fusing source 26 can include any suitable number and type of lamps to heat and irradiate build material. For example, each of the warming and fusing sources 24, 26 includes quartz infrared halogen lamps with each of the quartz infrared halogen lamps having a segmented filament. Fusing source 26 can include a series of thermal lamps each being longitudinally arranged in parallel with major axes disposed along the y-axis. Similarly, warming source 24 can include a series of thermal lamps each being longitudinally arranged in parallel with major axes disposed along the y-axis.

With reference to the fusing apparatus of FIG. 2A, warming source 24a and fusing source 26a each emit a uniform heat flux along respective major axes to provide a substantially uniform heat flux density in the build chamber. In one example, warming and fusing sources 24a, 26a each includes quartz infrared halogen lamps with each of the quartz infrared halogen lamps having a segmented filament spaced at a distance normal from build material such that the heat flux on build material is uniform. With reference to FIG. 3A, the uniform heat flux emitted by warming and fusing sources 24a, 26a, creates a substantially uniform heat distribution 28 along the longitudinal major axis. A build zone 30 can be positioned along the longitudinal y-axis within the uniform heat flux distribution area. In one example, fusing source 26 includes a lamp having a first higher coil density at opposing end sections of the filament than a second coil density along a central portion in order to emit increased power at the end sections to offset thermal conduction to walls of build chamber. A lamp axis profile for fusing source 26 includes increased power at opposing ends of the lamp filament to counteract conductive and convective losses within the build chamber. In one example, a peak to center variation is produced using increased power at opposing ends of the lamp filament of fusing lamps.

With reference to FIGS. 2B and 3B, in some examples, lamps of either one or both of warming source 24*b* and fusing source 26*b* can each emit non-uniform heat flux along the longitudinal major axes to form a non-uniform heat distribution. The non-uniform heat flux of warming and fusing sources 24*b*, 26*b* can be modified along the longitudinal major axes to deliver a uniform heat distribution 29 to the build material in build zone 30 during the build process. The non-uniform heat flux of warming and fusing sources 24*b*, 26*b* in combination with a flux modifier 32 can be employed to deliver a uniform heat distribution. For example, flux modifier 32 such one or multiple of a reflector, a field stop, a lens, a reflective filter, and an absorptive filter can be employed. Flux modifier 32 can modify a portion of the heat distribution emitted from the series of non-uniform heat sources to correct the heat flux into a substantially uniform heat flux density. As illustrated in FIG. 3B, dashed line 31 indicates the uncorrected heat distribution emitted from the series of non-uniform heat sources and solid line 29 indicates the correct heat flux density. A build zone 30 can be positioned along the longitudinal y-axis within the uniform heat flux distribution area.

With reference to FIGS. 2C and 3A, in some examples, the lamps of either one or both of warming source 24*c* and fusing source 26*c* can emit non-uniform heat flux along the major axes. In one example, lamps of warming and fusing sources 24, 26 can be arranged in a longitudinally overlapping pattern along the major axis of warming source 24 to form a first and a second longitudinally uniform heat fluxes, respectively. For example, lamps can be colder at end regions than at middle regions. Adjacent lamps can be arranged by longitudinally overlapping roll off, or colder, end regions with radiant energy of overlapping cold ends being additive such that the total energy transfer in the overlapped end regions being equivalent to the energy transfer from the warmer non-overlapping middle regions.

Figure 4:
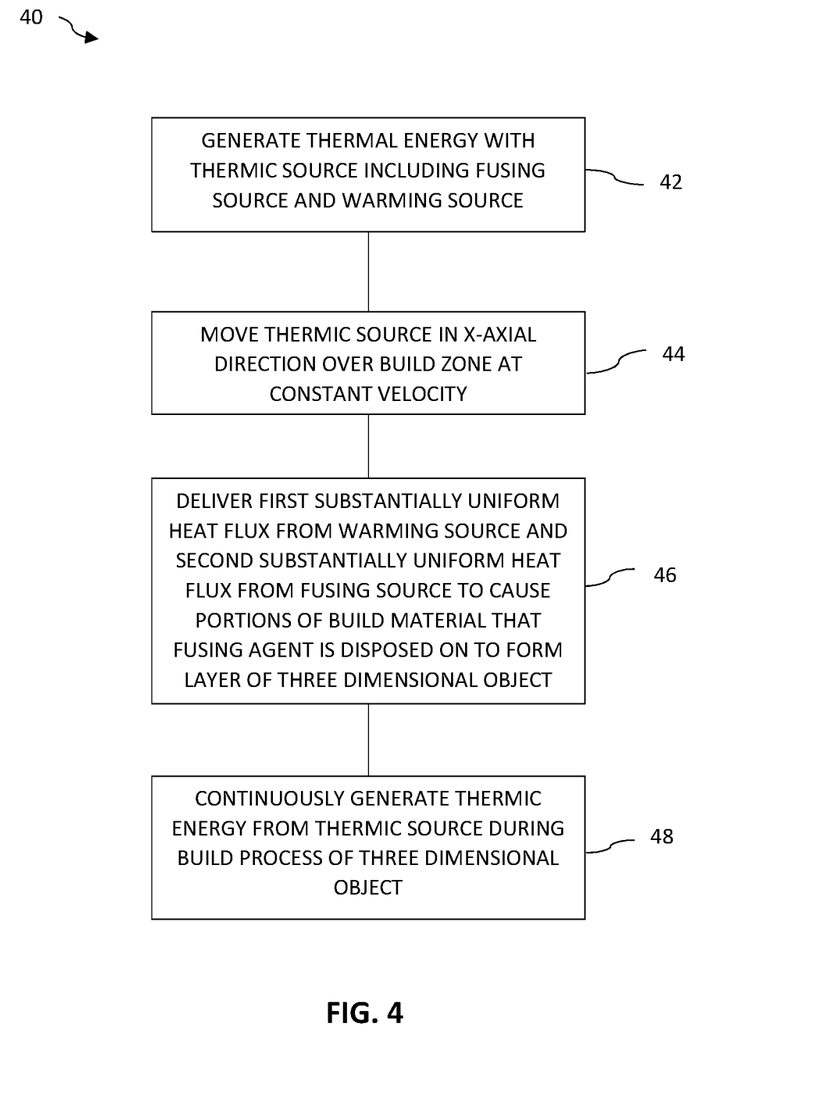
FIG. 4 is a flow chart of an example method of operating an additive manufacturing, machine in accordance with aspects of the present disclosure.

FIG. 4 is a flow chart of an example method 40 of operating an additive manufacturing machine in accordance with aspects of the present disclosure. At 42, thermal energy is generated with a thermic source including a warming source and a fusing source. Each of the warming and fusing sources have a major axis longitudinally extending in a y-axial direction above a build zone. Build zone can contain a build material and a fusing agent. At 44, thermic source is moved in an x-axial direction orthogonal to the y-axial direction over the build zone at a constant velocity. At 46, a first substantially uniform heat flux from the warming source and a second substantially uniform heat flux from the fusing source is delivered to cause portions of the build material that the fusing agent is disposed on to form a layer of a three dimensional object. At 48, thermic energy is continuously generating from the thermic source during a build process of the three dimensional object.

Figure 5:
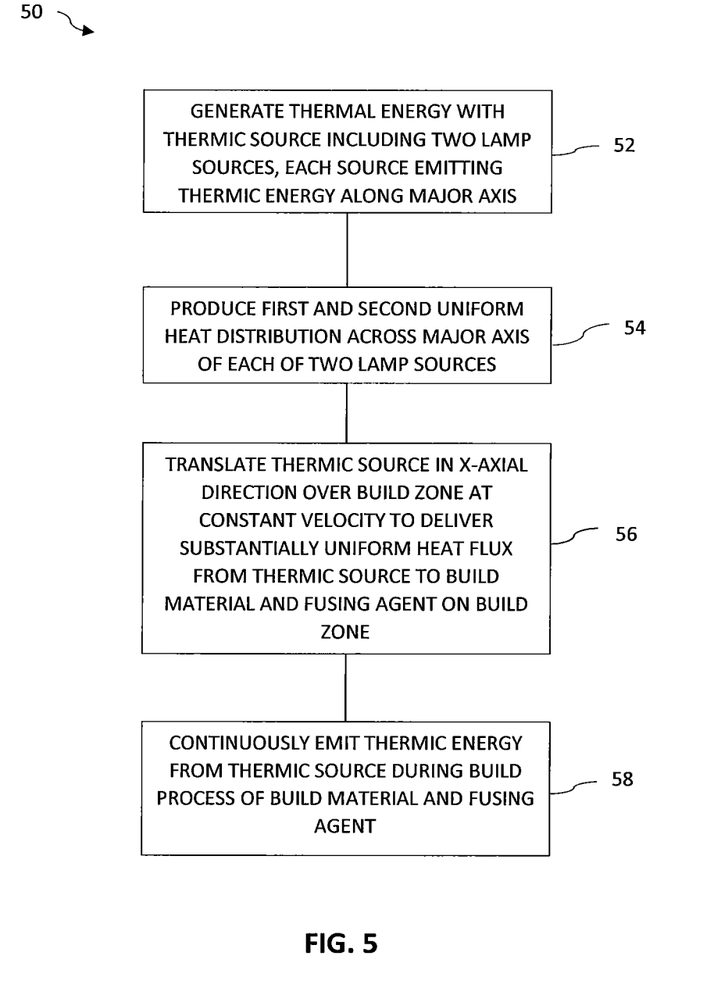
FIG. 5 is a flow chart of an example method of operating an additive manufacturing machine in accordance with aspects of the present disclosure.

FIG. 5 is a flow chart of another example method 50 of operating an additive manufacturing machine in accordance with aspects of the present disclosure. At 52, thermal energy is generated with a thermic source comprising of two lamp sources disposed in an x-axial direction from one another. Each of the two lamp sources emits thermic energy along a major axis extending in a y-axial direction. At 54, a first and second uniform heat distribution is produced across the major axis of each of the two lamp sources, respectively. At 56, the thermic source is translated in the x-axial direction over a build zone. The thermic source is translated at a constant velocity to deliver a substantially uniform heat flux from the thermic source to the build material and the fusing agent on the build zone. At 58, thermic energy is continuously emitted from the thermic source during a build process of build material and the fusing agent.

Figure 6:
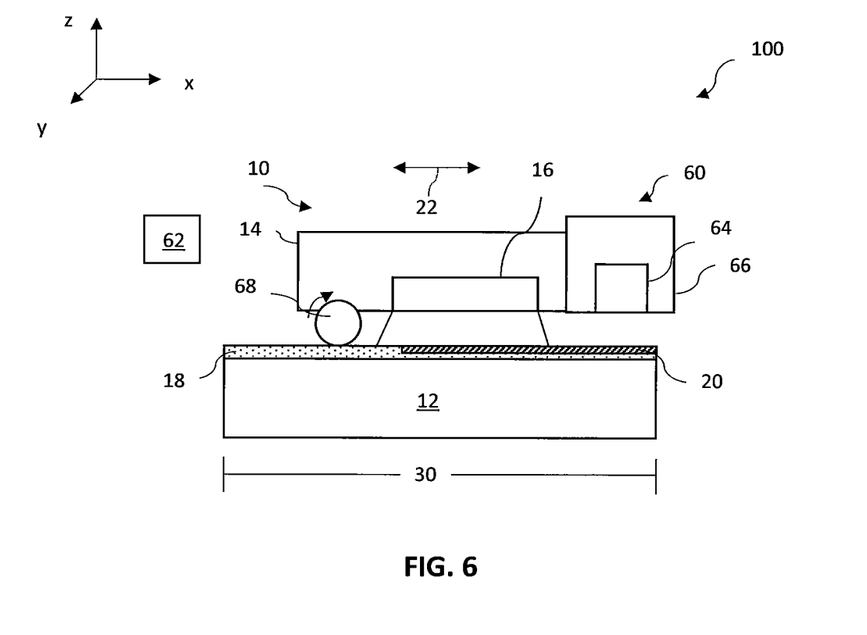
FIG. 6 is a schematic side view of an additive manufacturing machine in accordance with aspects of the present disclosure.

FIG. 6 illustrates one example of additive manufacturing machine 100 including fusing apparatus 10. In addition to fusing apparatus 10, additive manufacturing machine 100 includes a dispensing assembly 60 and a controller 62. Fusing assembly 10 and dispensing assembly 60 are movable along the x-axis over build chamber 12. Dispensing assembly 60 includes a printhead 64 (or other suitable liquid dispensing assemblies) mounted to a dispensing carriage 66 to selectively dispense fusing agent 20 and other liquid agents, if used. Build chamber 12 can contain build material 18 and fusing agent 20 as layers are formed. Build chamber 12 can be any suitable structure to support or contain build material 18 in build zone 30 for fusing, including underlying layers of build material 18 and in-process slice and other object structures. For a first layer of build material 18, for example, build chamber 12 can include a surface of a platform that can be moved vertically along the y-axis to accommodate the layering process. For succeeding layers of build material 18, build zone 30 can be formed on an underlying build structure within build chamber 12 including unfused and fused build material forming an object slice. Controller 62 can operations of additive manufacturing machine 100.

FIGS. 7A-10B are side and top schematic views illustrating an example sequence of a four pass fusing cycle using fusing apparatus 10 of an additive manufacturing machine. Each pass includes multiple operations that can occur simultaneously during the respective pass. Fusing apparatus 10 and dispensing assembly 60 move bi-directionally over build zone 30 within build chamber 12 along the same line of motion so that carriages 14, 66 can follow each other across build zone 30. A dual carriage fusing system in which carriages 14, 66 move along the same line of motion helps enable faster slew speeds and overlapping functions in each pass. The direction of movement of the passes, in accordance with one example, is indicated by arrows in FIGS. 7A-10B. Carriages 14, 66 of fusing apparatus 10 and dispensing assembly 60 can move completely and entirely across build zone 30 and can be positioned on either side of build zone 30. In general, a roller 68 of fuser carriage 14 spreads build material 18 to form layers over build zone 30. Dispenser carriage 66 carries agent dispenser 64 to dispense fusing agent 20 on to each layer of build material 18. Thermic source 16 carried by carriage 14 heats and irradiates layered build material 18 and fusing agent 20. Thermic source 16 is spaced a normal vector distance from build material 18 during the build process.

Figure 7A:
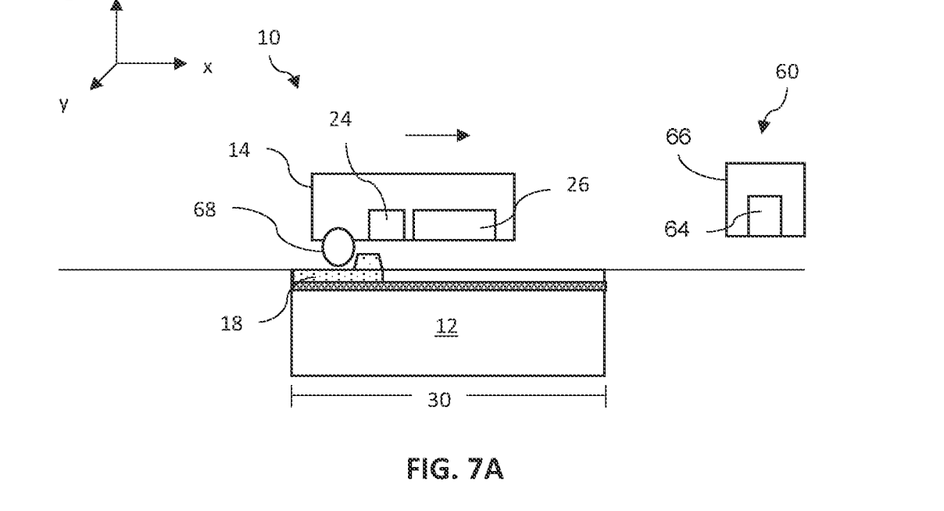
Figure 7B:
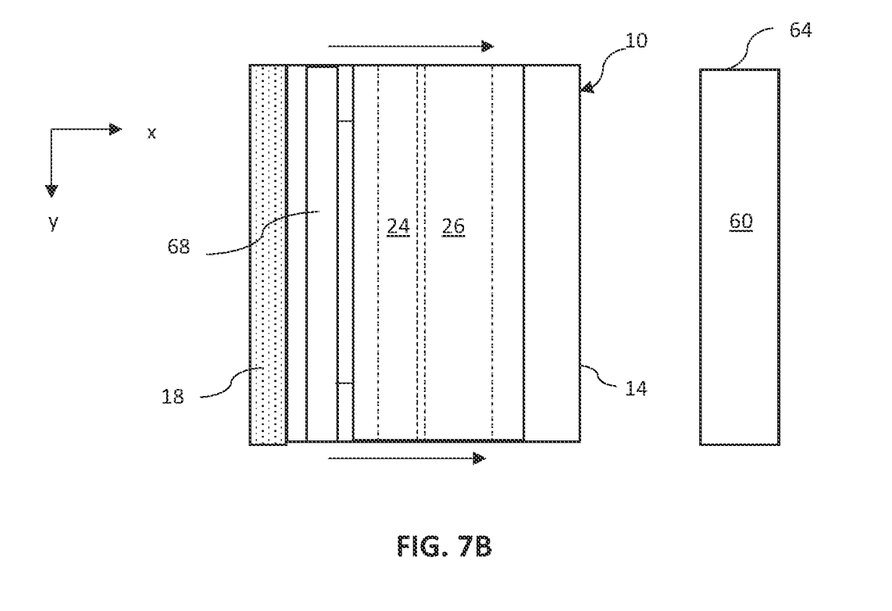

With reference to FIGS. 7A and 7B, in a first pass of the example sequence, as fuser carriage 14 begins at left of build zone 30 and moves across build zone 30 toward right side of build zone 30. Warming source, or lamp, 24 is powered on to heat the underlying layer/slice in front of roller 68 as roller 68 passed across build zone 30 to form a first, or next, layer of build material 18. Roller 68 is positioned to contact build material 18 during the first spreading pass. Thermic energy from lamp 24 is employed to uniformly heat previous layers of build material 18 in build zone 30. After first pass has been completed, fuser carriage 14 is positioned to right side of build zone 30 and roller 68 prepares for a second pass.

Figure 8A:
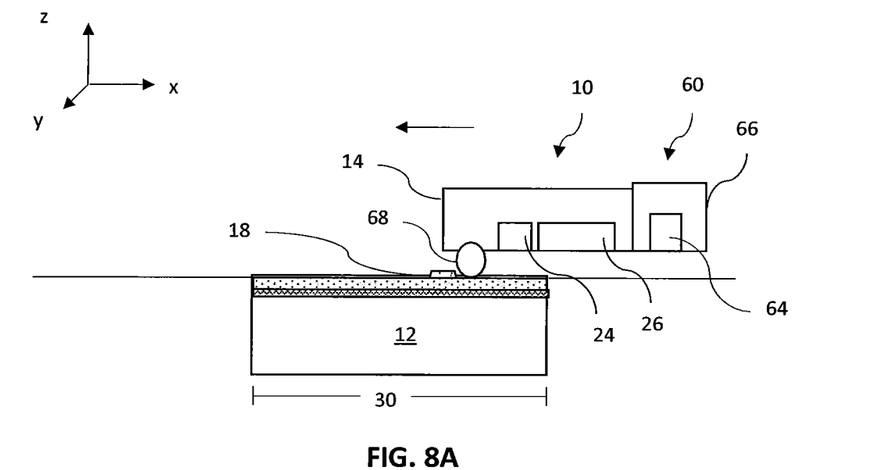
Figure 8B:
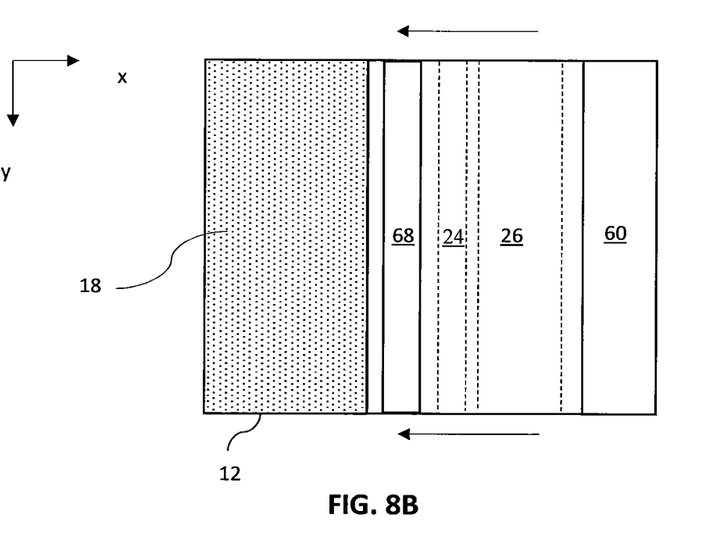

Second pass is illustrated in FIGS. 8A and 8B. In second pass, as fuser carriage 14 moves back over build zone 30 from the right to the left, warming lamp 24 is on to heat the new layer of build material 18 in advance of dispenser carriage 66, which follows fuser carriage 14 over build zone 30 to dispense fusing and/or detailing agents on to the heated build material 18 in a pattern based on a next object slice. Roller 68 can complete spreading build material 18 that may not be completely spread during first pass, in advance of warming lamp 24 and dispenser carriage 66.

Figure 9A:
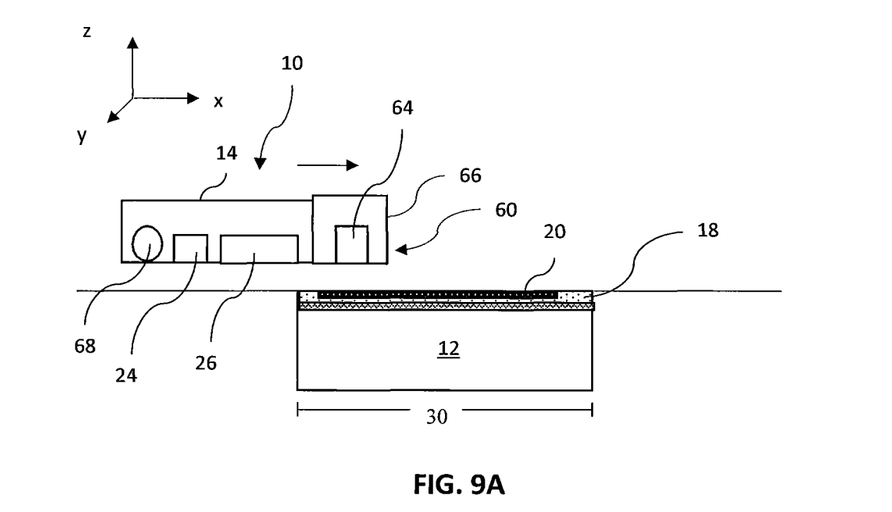
Figure 9B:
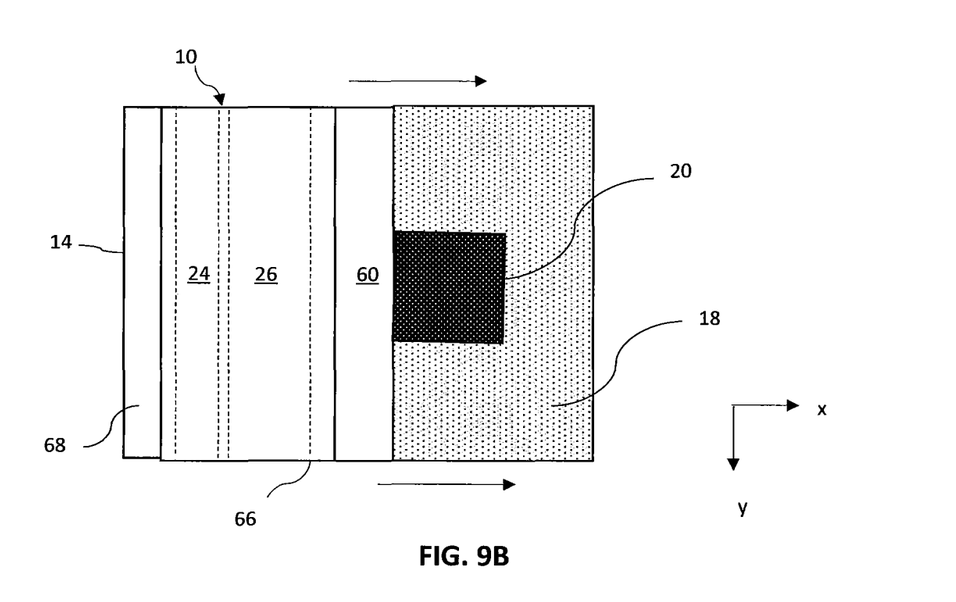

Third pass is illustrated in FIGS. 9A and 9B. Third pass is a fusing pass. In third pass, dispenser carriage 66 moves back over build zone 30, from left to right, to dispense fusing and/or detailing agents 20 on to build material 18, followed by fuser carriage 14 with fusing lamp 26 on to expose patterned build material to fusing energy.

Figure 10A:
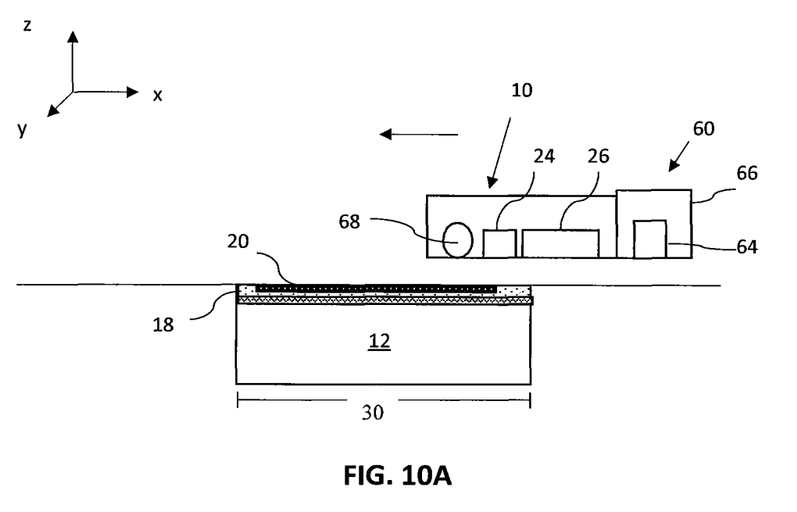
Figure 10B:
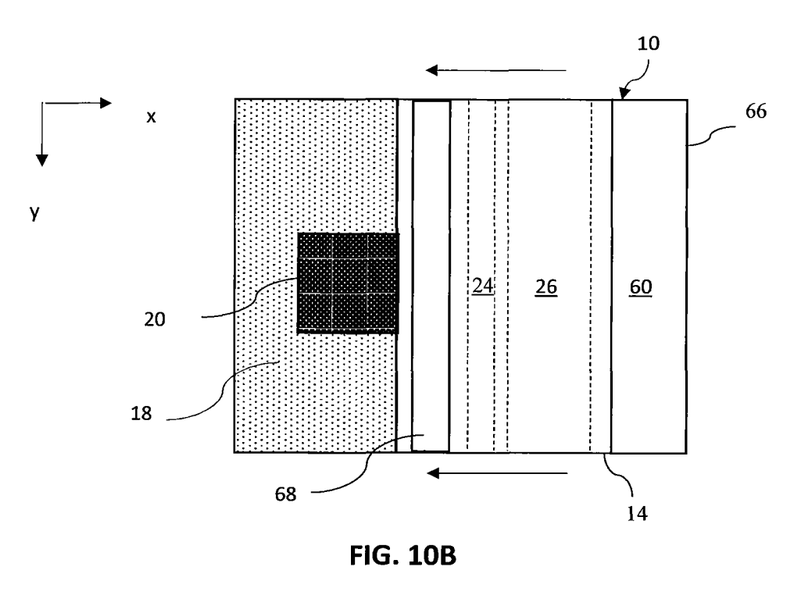

In fourth pass, as illustrated in FIGS. 10A and 10B, as fuser carriage 14 moves back over build zone 30, from right to left, and fusing lamp 26 is on to expose patterned build material to fusing energy.

The four pass process may be repeated for successive layers of build material as the object is manufactured layer by layer and slice by slice. In one example, each pass is performed at a slew speed of 22-25 inches per second (ips). The slew speed can vary depending on the type of build material employed. Moving fusing system over build zone at a constant uniform velocity during each pass aids in providing uniformity of heat flux density on build material.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of operating an additive manufacturing machine, comprising:
generating thermal energy with a thermic source including a warming source and a fusing source, each of the warming and fusing sources having a major axis longitudinally extending in a y-axial direction above a build zone, the build zone to contain a build material and a fusing agent;
moving the thermic source in a x-axial direction orthogonal to the y-axial direction over the build zone at a constant velocity;
delivering a first substantially uniform heat flux from the warming source and a second substantially uniform heat flux from the fusing source to cause portions of the build material that the fusing agent is disposed on to form a layer of a three dimensional object, including emitting a non-uniform heat flux along the major axis of each of the warming and fusing sources, and modifying, with a flux modifier and by partially overlapping end regions of the warming and fusing sources, a portion of the non-uniform heat flux along the major axis of each of the warming and fusing sources to deliver the first and second substantially uniform heat flux; and
continuously generating thermic energy from the thermic source during a build process of the three dimensional object.

2. The method of claim 1, wherein the flux modifier comprises at least one of a reflector, a field stop, a lens, a reflective filter, and an absorptive filter for modifying the portion of the non-uniform heat flux to deliver the first and second substantially uniform heat flux.

3. The method of claim 1, wherein each of the warming and fusing sources have a first coil density at opposing end sections and a second coil density at a central section extending between the opposing end sections, wherein the first coil density is greater than the second coil density.

4. The method of claim 1, wherein the warming source is to warm the build material in locations that the fusing agent is absent and the fusing source is to heat the portions of the build material in locations that the fusing agent is disposed on to cause build material fusing.

5. A method of operating an additive manufacturing machine, comprising:
generating thermal energy with a thermic source comprising two lamp sources disposed in a x-axial direction from one another, each of the two lamp sources emitting thermic energy along a major axis extending in a y-axial direction;
producing a first and second substantially uniform heat distribution across the major axis of each of the two lamp sources, respectively, including emitting a non-uniform heat distribution along the major axis of each of the two lamp sources, and modifying, with a flux modifier and by partially overlapping end regions of the two lamp sources, a portion of the non-uniform heat distribution along the major axis of each of the two lamp sources to produce the first and second substantially uniform heat distribution;
translating the thermic source in the x-axial direction over a build zone, the build zone to contain a build material and a fusing agent, the thermic source being translated at a constant velocity to deliver a substantially uniform heat flux from the thermic source to the build material and the fusing agent on the build zone; and
continuously emitting thermic energy from the thermic source during a build process of build material and the fusing agent.

6. The method of claim 5, wherein producing the first and second substantially uniform heat distribution includes modifying the heat distribution emitted from each of the two lamp sources with an absorption device.

7. The method of claim 5, wherein producing the first and second substantially uniform heat distribution includes modifying the heat distribution emitted from each of the two lamp sources with a reflective device.

8. The method of claim 5, wherein each of the at least two lamp sources have a first coil density at opposing end sections and a second coil density at a central section extending between the opposing end sections, wherein the first coil density is greater than the second coil density.

9. A fusing apparatus for an additive manufacturing machine, comprising:
a carriage to be moved across a build chamber bi-directionally along an x-axis at a uniform velocity in each direction during a build process;
a thermic source mounted to the carriage, the thermic source movable with the carriage in the x-axial direction, the thermic source comprising a warming source and a fusing source, the thermic source including a series of non-uniform heat sources each extending longitudinally in a y-axial direction orthogonal to the x-axis and arranged in a partially overlapping additive profile; and a flux modifier to modify a portion of a heat distribution emitted from the series of non-uniform heat sources, the flux modifier and the partially overlapping additive profile of the series of non-uniform heat sources forming a substantially uniform heat flux density in the y-axial direction.

10. The fusing apparatus of claim 9, wherein the thermic source is a quartz infrared halogen lamp.

11. The fusing apparatus of claim 9, wherein each of the series of non-uniform heat sources have a first coil density at opposing end sections and a second coil density at a central section extending between the opposing end sections, wherein the first coil density is greater than the second coil density.

12. The fusing apparatus of claim 9,
wherein the flux modifier comprises at least one of a reflector, a field stop, a lens, a reflective filter, and an absorptive filter to modify the portion of the heat distribution emitted from the series of non-uniform heat sources into the substantially uniform heat flux density.

\* \* \* \* \*